US012334667B2

(12) United States Patent
Kamemura et al.

(10) Patent No.: US 12,334,667 B2
(45) Date of Patent: Jun. 17, 2025

(54) TERMINAL UNIT AND CONNECTOR

(71) Applicant: SUMITOMO WIRING SYSTEMS, LTD., Mie (JP)

(72) Inventors: Masato Kamemura, Mie (JP); Ryota Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 406 days.

(21) Appl. No.: 17/800,398

(22) PCT Filed: Feb. 10, 2021

(86) PCT No.: PCT/JP2021/004938
§ 371 (c)(1),
(2) Date: Aug. 17, 2022

(87) PCT Pub. No.: WO2021/166759
PCT Pub. Date: Aug. 26, 2021

(65) Prior Publication Data

US 2023/0128184 A1 Apr. 27, 2023

(30) Foreign Application Priority Data

Feb. 21, 2020 (JP) ................................ 2020-027843

(51) Int. Cl.
*H01R 13/44* (2006.01)

(52) U.S. Cl.
CPC .................................. *H01R 13/44* (2013.01)

(58) Field of Classification Search
CPC .................. H01R 13/44; H01R 13/443; H01R 13/5213
USPC .......................................................... 439/149
See application file for complete search history.

(56) References Cited

U.S. PATENT DOCUMENTS 7,442,096 B1 * 10/2008 Gilliam .................. H01R 13/44
439/825
7,775,814 B1 * 8/2010 Bhutani ............... H01R 13/447
439/146
8,951,051 B2 * 2/2015 Natter .................... H01R 13/04
439/135
(Continued)

FOREIGN PATENT DOCUMENTS

DE 102015107304 A1 11/2016
JP 2014-179290 A 9/2014

*Primary Examiner* — Harshad C Patel
(74) *Attorney, Agent, or Firm* — Venjuris, P.C.

(57) ABSTRACT

A problem to be solved by the present disclosure is to provide a terminal unit and a connector capable of suppressing the contact of a worker's hand and a terminal body over a wide range. A terminal unit is provided with a plate-like terminal fitting including a connection region used for electrical connection to a mating terminal, and an insulating member to be mounted on the terminal fitting. The terminal fitting has a side surface extending along a third direction and a connection surface extending in a direction intersecting the third direction. The insulating member includes an extending portion that covers a region including a tip and a surrounding portion that covers a part of the connection surface. The connection region is located on the connection surface. The surrounding portion is provided on a side opposite to the tip with respect to the connection region in the first direction.

9 Claims, 3 Drawing Sheets

(56) References Cited

U.S. PATENT DOCUMENTS

| | | | | |
|---|---|---|---|---|
| 2007/0232148 | A1* | 10/2007 | Aime | H01R 13/443 439/660 |
| 2016/0093970 | A1* | 3/2016 | Wu | H01R 13/6581 439/148 |
| 2018/0358732 | A1 | 12/2018 | Yamanashi et al. | |
| 2020/0014140 | A1 | 1/2020 | Duenkel et al. | |
| 2021/0091503 | A1 | 3/2021 | Mori et al. | |
| 2022/0013945 | A1* | 1/2022 | Kobayashi | H01R 13/42 |
| 2022/0328996 | A1* | 10/2022 | Mastel | H01R 13/44 |
| 2023/0040389 | A1* | 2/2023 | Yamada | H01R 13/447 |
| 2024/0170876 | A1* | 5/2024 | Cruble | H01R 13/04 |

* cited by examiner

TERMINAL UNIT AND CONNECTOR

CROSS REFERENCE TO RELATED APPLICATIONS

This application is a national phase of PCT application No. PCT/JP2021/004938, filed on 10 Feb. 2021, which claims priority from Japanese Patent Application No. 2020-027843, filed on 21 Feb. 2020, all of which are incorporated herein by reference.

TECHNICAL FIELD

The present disclosure relates to a terminal unit and a connector.

BACKGROUND

Conventionally, a terminal is known which is provided with a terminal body made of metal and an insulating member having an insulating property and to be mounted on the terminal body (see, for example, Patent Document 1).

The terminal body described in Patent Document 1 includes a plate-like main portion and two projecting portions projecting from the tip of the main portion.

Further, the insulating member includes an insulating end portion and an auxiliary portion extending from the insulating end portion toward the terminal body and to be sandwiched between the respective projecting portions. Parts of the insulating end portion corresponding to the respective projecting portions are provided with recesses. The respective projecting portions are press-fit into the respective recesses, whereby the insulating member is fixed to the tip of the terminal body.

The contact of a worker's hand with the terminal body can be suppressed by such an insulating member.

PRIOR ART DOCUMENT

Patent Document

Patent Document 1: JP 2014-179290 A

SUMMARY OF THE INVENTION

Problems to be Solved

In the terminal described in Patent Document 1, since the insulating member is provided only on the tip side of the terminal body, the worker's hand may touch side surfaces in a width direction of the terminal body.

The present disclosure aims to provide a terminal unit and a connector capable of suppressing the contact of a worker's hand and a terminal body.

Means to Solve the Problem

A terminal unit of the present disclosure is a terminal unit used for electrical connection to a mating terminal and is provided with a plate-like terminal fitting including a connection region used for electrical connection to the mating terminal and an insulating member to be mounted on the terminal fitting, wherein the terminal fitting has a side surface extending along a plate thickness direction of the terminal fitting and a connection surface extending in a direction intersecting the plate thickness direction, the insulating member includes an extending portion configured to cover a region including a tip of the terminal fitting in a longitudinal direction and a surrounding portion configured to cover a part of the connection surface, the connection region is located on the connection surface, and the surrounding portion is provided on a side opposite to the tip with respect to the connection region in the longitudinal direction.

A connector of the present disclosure is a connector electrically connectable to a mating connector including a mating terminal and is provided with the above terminal unit and a housing configured to accommodate the terminal unit.

Effect of Invention

According to the present disclosure, it is possible to suppress the contact of a worker's hand and a terminal fitting over a wide range.

DETAILED DESCRIPTION TO EXECUTE THE INVENTION

Description of Embodiments of Present Disclosure

Figure 1:
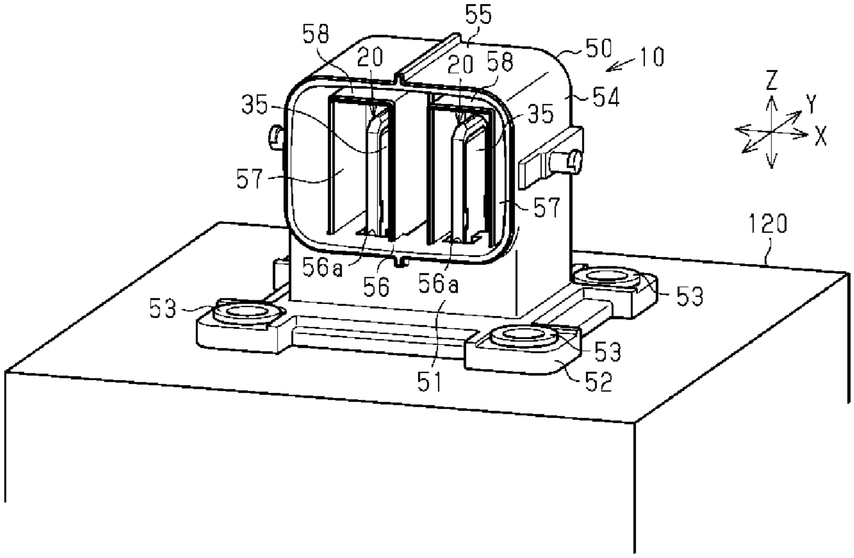
FIG. 1 is a perspective view of a connector in one embodiment.

First, embodiments of the present disclosure are listed and described.

[1] The terminal unit of the present disclosure is a terminal unit used for electrical connection to a mating terminal and is provided with a plate-like terminal fitting including a connection region used for electrical connection to the mating terminal and an insulating member to be mounted on the terminal fitting, wherein the terminal fitting has a side surface extending along a plate thickness direction of the terminal fitting and a connection surface extending in a direction intersecting the plate thickness direction, the insulating member includes an extending portion configured to cover a region including a tip of the terminal fitting in a longitudinal direction and a surrounding portion configured to cover a part of the connection surface, the connection region is located on the connection surface, and the surrounding portion is provided on a side opposite to the tip with respect to the connection region in the longitudinal direction.

According to this configuration, the insulating member includes the extending portion configured to cover the region of the side surface including the tip of the terminal fitting in the longitudinal direction. Thus, the contact of a worker's hand and the terminal fitting is suppressed over a wide range.

Further, according to this configuration, relative displacements of the terminal fitting and the insulating member in the plate thickness direction of the terminal fitting are restricted by the surrounding portion of the insulating member. Therefore, the detachment of the insulating member from the terminal fitting is suppressed by a simple configuration.

[2] Preferably, the extending portion includes a recess configured to accommodate the tip.

According to this configuration, the tip of the terminal fitting is accommodated into the recess formed in the insulating member. Therefore, the detachment of the insulating member from the terminal fitting is further suppressed.

[3] Preferably, the side surfaces of the terminal fitting include a first side surface located on one side in a width direction intersecting the plate thickness direction and the longitudinal direction and a second side surface located on the other side in the width direction, the extending portion includes a part configured to cover the first side surface and a part configured to cover the second side surface, and the part configured to cover the first side surface and the part configured to cover the second side surface are provided to sandwich the terminal fitting from the side of the first side surface and the side of the second side surface.

According to this configuration, the insulating member sandwiches the terminal fitting from the side of the first side surface and the side of the second side surface by the part configured to cover the first side surface and the part configured to cover the second side surface. Therefore, the detachment of the insulating member from the terminal fitting is further suppressed.

[4] Preferably, the surrounding portion includes a first projecting part extending from the part configured to cover the first side surface toward a center of the connection surface in the width direction and a second projecting part extending from the part configured to cover the second side surface toward the center of the connection surface in the width direction, and an end part of the first projecting part and an end part of the second projecting part are separated in the width direction.

According to this configuration, the insulating member can allow a change in distance between the part configured to cover the first side surface and the part configured to cover the second side surface as compared to the case where the end part of the first projecting part and that of the second projecting part are not separated. Therefore, the insulating member is easily mounted on the terminal fitting.

[5] Preferably, the extending portion is resiliently deformable to change a distance between the part configured to cover the first side surface and the part configured to cover the second side surface in the width direction.

According to this configuration, the insulating member can allow a change in distance between the part configured to cover the first side surface and the part configured to cover the second side surface. Therefore, the insulating member is easily mounted on the terminal fitting.

[6] Preferably, the connection surfaces include a first connection surface located on one side in the plate thickness direction and a second connection surface located on the other side in the plate thickness direction, the surrounding portion includes a part configured to cover the first connection surface and a part configured to cover the second connection surface, and the part configured to cover the first connection surface and the part configured to cover the second connection surface are provided to sandwich the terminal fitting from the side of the first connection surface and the side of the second connection surface.

According to this configuration, since the insulating member can sandwich the terminal fitting from the side of the first connection surface and the side of the second connection surface, the detachment of the insulating member from the terminal fitting can be further suppressed.

[7] Preferably, the terminal fitting includes a locking recess formed in the side surface, and the extending portion includes a projection to be fit into the locking recess at a position corresponding to the locking recess.

According to this configuration, since the locking projection provided on the insulating member is fit into the locking recess provided in the terminal fitting, relative displacements of the terminal fitting and the insulating member are restricted. Therefore, the detachment of the insulating member from the terminal fitting can be further suppressed.

[8] According to another aspect of the present disclosure, a connector is provided which is electrically connectable to a mating connector including a mating terminal. This connector is provided with a terminal unit according to any one of [1] to [7] described above, and a housing configured to accommodate the terminal unit.

According to this configuration, functions and effects based on those of the terminal unit according to any one of [1] to [7] described above can be achieved.

Details of Embodiment of Present Disclosure

Specific examples of a terminal and a terminal unit of the present disclosure are described below with the drawings. In each figure, some of components may be shown in an exaggerated or simplified manner for the convenience of description. Further, a dimension ratio of each part may be different in each figure. Note that the present disclosure is not limited to these illustrations and is intended to be represented by claims and include all changes in the scope of claims and in the meaning and scope of equivalents. "Orthogonal" in this specification means not only strictly orthogonal, but also substantially orthogonal within a range in which functions and effects in an embodiment are achieved. In the following description, "extending along" preferably means that an angle between a reference direction and an extending direction is 10° or less. In this case, the angle between the reference direction and the extending direction is preferably 5° or less, more preferably 1° or less and most preferably 0°, i.e. these directions are parallel. Further, in the following description, "intersecting" preferably means intersecting at an angle of 80° or more with respect to a reference direction. In this case, the angle with respect to the reference direction is more preferably 85° or more, even more preferably 89° or more and most preferably 90°, i.e. perpendicular to the reference direction.

<Configuration of Connector 10>

As shown in FIG. 1, a connector 10 is mounted on a case 120 of a device with a part thereof projecting from the case 120. Note that a vertical direction in each figure does not necessarily represent postures of the connector 10 in use.

The connector 10 includes a plurality of plate-like terminal units 20 and a housing 50 made of resin for accommodating these terminal units 20. In this embodiment, two terminal units 20 are accommodated side by side in the housing 50.

<Configuration of Terminal Units 20>

Figure 2:
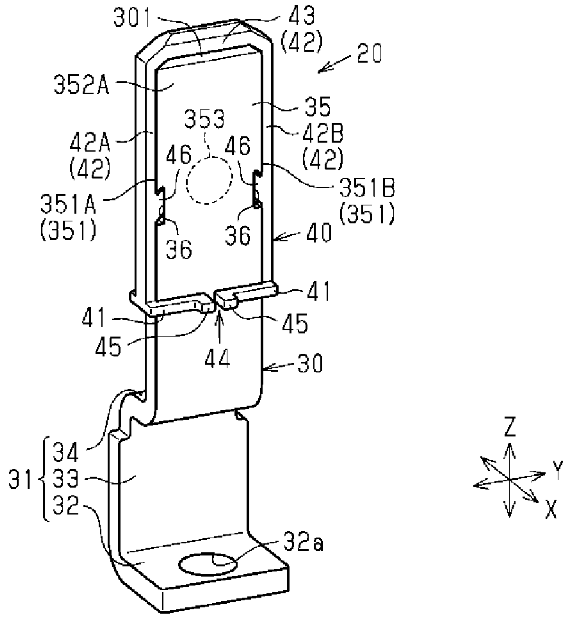
FIG. 2 is a perspective view of a terminal unit of the embodiment.

As shown in FIG. 2, each terminal unit 20 is provided with a terminal fitting 30 made of metal and including a base portion 31 and a connecting end portion 35 in the form of a flat plate extending from the base portion 31, and an insulating member 40 to be mounted on the connecting end portion 35. The terminal body 30 is, for example, formed by press-working a metal plate material of copper, copper alloy, aluminum, aluminum alloy or the like. The insulating member 40 is formed of an insulating resin material.

A first direction Z is a longitudinal direction of the terminal fitting 30, specifically the connecting end portion 35 below. A second direction Y is a width direction of the connecting end portion 35 and orthogonal to the first direction Z. A third direction X is a plate thickness direction of the connecting end portion 35 and orthogonal to both the first and second directions Z, Y. In this embodiment, the second direction Y intersects perpendicularly to the first direction Z. Further, the third direction X intersects perpendicularly to the first and second directions Z, Y. Note that although the first, second and third directions Z, Y and Z intersect perpendicularly to each other, these directions may not necessarily intersect perpendicularly to each other.

<Configuration of Terminal Fittings 30>

As shown in FIG. 2, the base portion 31 includes a first straight portion 32 linearly extending along the third direction X, a second straight portion 33 bent from the first straight portion 32 and linearly extending along the first direction Z and a third straight portion 34 linearly extending along the third direction X from the second straight portion 33. The third straight portion 34 extends toward the same side as the first straight portion 32 in the third direction X. The first straight portion 32 is provided with a through hole **32*a* penetrating in the first direction Z. The connecting end portion 35 has a first connection surface 352A and a second connection surface 352B intersecting the third direction X (see FIG. 5). The first connection surface 352A is located on one side in the third direction X. The second connection surface 352B is located on the other side in the third direction X. The first connection surface 352A includes a connection region 353 used for electrical connection to a mating terminal, which is a terminal of a mating connector mountable into the connector 10. The connection region 353 is a region indicated by a broken line in FIG. 2 for the sake of convenience. In the connection region 353, an electrical contact between a mating terminal and the terminal fitting 30 is formed when the mating connector is mounted into the connector 10. In this embodiment, the connection region 353 is formed on the first connection surface 352A, out of the respective connection surfaces 352A, 352B, and is not formed on the second connection surface 352B. The terminal fitting 30 has side surfaces 351 extending along the third direction X. The side surfaces 351 include a first side surface 351A and a second side surface 351B. Note that the first side surface 351A is the one located on one side in the second direction Y, out of the side surfaces 351. Further, the second side surface 351B is the one located on the other side in the second direction Y, out of the side surfaces 351**.

Locking recesses 36 are provided in the first and second side surfaces 351A, 351B of the connecting end portion 35 in the second direction Y.

<Configuration of Insulating Members 40>

Figure 3:
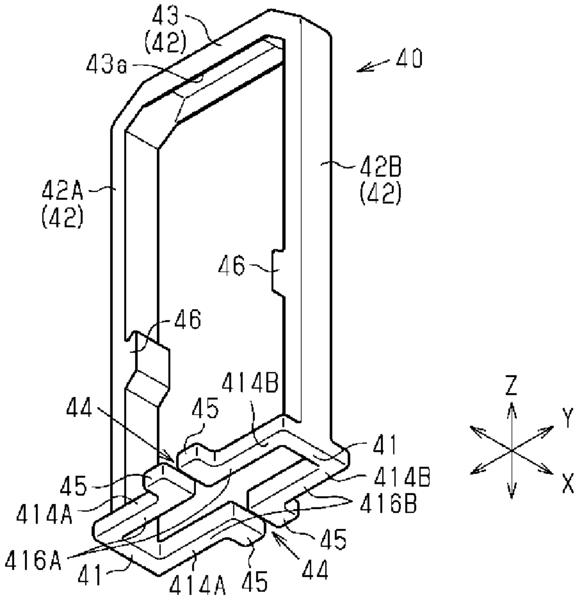
FIG. 3 is a perspective view of an insulating member of the embodiment.

As shown in FIGS. 2 and 3, the insulating member 40 includes a surrounding portion 41 configured to surround the connection surfaces 352A, 352B, and an extending portion 42 configured to cover the side surfaces 351 including a tip 301 of the terminal fitting 30. The surrounding portion 41 surrounds a part of the connecting end portion 35 on the side of the base portion 31. The extending portion 42 extends from the surrounding portion 41 toward the tip 301 of the connecting end portion 35 along the first direction Z and covers the both side surfaces 351A, 351B of the connecting end portion 35 in the second direction Y.

The extending portion 42 includes a part 42A configured to cover the first side surface 351A and a part 42B configured to cover the second side surface 351B. Further, the extending portion 42 includes a coupling portion 43 coupling the part 42A configured to cover the first side surface 351A and the part 42B configured to cover the second side surface 351B. The coupling portion 43 covers the tip surface of the connecting end portion 35. The parts 42A, 42B are provided to sandwich the terminal fitting 30 from the side of the first side surface 351A and the side of the second side surface 351B.

As shown in FIG. 3, the surrounding portion 41 is provided on a side opposite to the tip surface with respect to the connection region 353 in the first direction Z, which is the longitudinal direction of the terminal fitting 30. The surrounding portion 41 also includes first projecting parts 414A extending from the part 42A of the extending portion 42 configured to cover the first side surface 351A toward centers of the connection surfaces 352A, 352B in the second direction Y. The surrounding portion 41 further includes second projecting parts 414B extending from the part 42B of the extending portion 42 configured to cover the second side surface 351B toward the centers of the connection surfaces 352A, 352B in the second direction Y. In this embodiment, the surrounding portion 41 includes a part 416A configured to cover the first connection surface 352A and a part 416B configured to cover the second connection surface 352B and are provided to sandwich the terminal fitting 30 from the side of the first connection surface 352A and the side of the second connection surface 352B.

Figure 4:
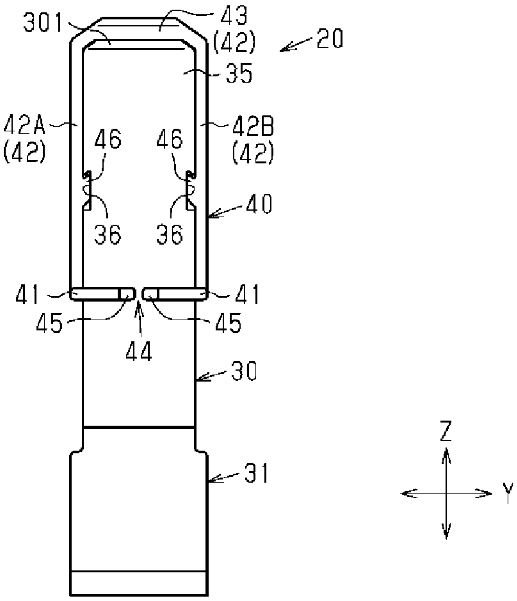
FIG. 4 is a front view of the terminal unit of the embodiment.

As shown in FIG. 4, a maximum dimension of the insulating member 40 in the second direction Y is substantially equal to that of the terminal fitting 30 in the second direction Y.

As shown in FIG. 3, dividing portions 44 dividing the surrounding portion 41 in a circumferential direction of the surrounding portion 41 are respectively provided in parts of the surrounding portion 41 on both sides in the third direction X. Accordingly, in each dividing portion 44, the end edges of parts of the surrounding portion 41 extending along the second direction Y are facing each other. That is, end parts of the first projecting parts 414A and end parts of the second projecting parts 414B are separated in the second direction Y.

Out of the insulating member 40, at least the extending portion 42 is resilient and can be resiliently deformed to change a distance in the second direction Y between a part configured to cover the first side surface 351A and a part configured to cover the second side surface 351B. Thus, the insulating member 40 is easily mounted on the terminal fitting 30.

Positioning portions 45 projecting along the third direction X from the respective end edges are provided on both sides of the surrounding portion 41 in the third direction X.

Locking projections 46 to be locked to the respective locking recesses 36 of the connecting end portion 35 are formed on the inner surface of the extending portion 42. Each locking projection 46 extends obliquely toward the coupling portion 43 from the inner surface of the extending portion 42 toward an inner side in the second direction Y. The locking projection 46 is provided at a position corresponding to the locking recess 36. The locking projection 46 is structured to be fit into the locking recess 36. The locking projection 46 corresponds a projection in the above [Description of Embodiments of the Present Disclosure].

Figure 5:
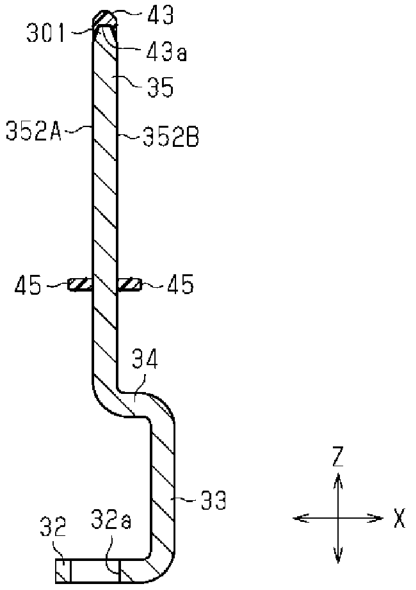
FIG. 5 is a section of the terminal unit of the embodiment.

As shown in FIG. 5, the coupling portion 43 is formed with a recess **43*a* configured to accommodate the tip 301 of the connecting end portion 35. Note that the tip 301 of the connecting end portion 35 has a tapered shape. Note that the recess 43***a* corresponds to a recess in the above [Description of Embodiments of the Present Disclosure].

As shown in FIG. 5, a plate thickness of the connecting end portion 35 is substantially equal to a thickness of the extending portion 42 in the third direction X <Configuration of Housing 50>

As shown in FIG. 1, the housing 50 includes a body portion 51 configured to accommodate the both terminal units 20 and projecting along the first direction Z from the case 120, and a flange 52 projecting toward an outer peripheral side over the entire periphery of the body portion 51.

The flange 52 is provided with a plurality of hollow cylindrical collars 53. Unillustrated bolts are inserted into the respective collars and screwed into the case 120, whereby the connector 10 is fixed to the case 120.

The housing 50 includes an outer side wall 54 configured to cover the connecting end portions 35 of the both terminal units 20 around an axis along the first direction Z and open on the one side in the second direction Y, an outer top wall 55 configured to cover the tips 301 of the both connecting end portions 35 in the first direction Z, and a facing wall 56 facing the outer top wall 55. The connecting end portions 35 of the respective terminal units 20 project from the facing wall 56.

The outer side wall 54 has a substantially U-shaped cross-sectional shape orthogonal to the first direction Z and covers both sides in the third direction X and the other side in the second direction Y of each connecting end portion 35.

The outer top wall 55 is provided to be continuous with the tip edge of the outer side wall 54 in the first direction Z.

Further, the housing 50 includes two inner side walls 57 configured to individually cover the respective connecting end portions 35 inside the outer side wall 54 and two inner top walls 58 configured to individually cover the tip sides of the respective connecting end portions 35 in the first direction Z inside the outer top wall 55.

Each inner side wall 57 has a substantially U-shaped cross-sectional shape orthogonal to the first direction Z and covers both sides in the third direction X and the other side in the second direction Y of each connecting end portion 35.

The inner top wall 58 is provided to be continuous with the tip edge of the inner side wall 57 in the first direction Z.

From the above, the outer side wall 54 and each inner side wall 57 are both open on the one side in the second direction Y. The connecting end portions 35 of the respective terminal units 20 are exposed to outside through these openings.

The facing wall 56 is provided with two insertion holes 56*a*, through which the respective terminal units 20 are inserted. Although not shown, steps to which the positioning portions 45 provided on the insulating member 40 of each terminal unit 20 are locked in the first direction Z are provided to be continuous with each insertion hole 56*a* inside the facing wall 56.

Functions and effects of this embodiment are described.

(1) The terminal unit 20 is provided with the plate-like terminal fitting 30 including the connection region 353 used for electrical connection to the mating terminal, and the insulating member 40 to be mounted on the terminal fitting 30. The terminal fitting 30 has the side surfaces 351 extending along the third direction X and the connection surfaces 352A, 352B extending in the direction intersecting the third direction X. The insulating member 40 includes the extending portion 42 configured to cover the region including the tip 301 and the surrounding portion 41 configured to cover parts of the connection surfaces 352A, 352B. The connection region 353 is located on the connection surface 352A. The surrounding portion 41 is provided on the side opposite to the tip 301 with respect to the connection region 353 in the first direction Z.

According to this configuration, the insulating member 40 includes the extending portion 42 configured to cover the regions including the tip 301 in the first direction Z of the terminal fitting 30, out of the side surfaces 351. Thus, the contact of a worker's hand and the terminal fitting 30 is suppressed over a wide range.

Further, according to the above configuration, relative displacements of the terminal fitting 30 and the insulating member 40 in the third direction X are restricted by the surrounding portion 41 of the insulating member 40. Therefore, the detachment of the insulating member 40 from the terminal fitting 30 is suppressed by a simple configuration.

(2) The coupling portion 43 is formed with the recess 43*a* configured to accommodate the tip 301 of the connecting end portion 35.

According to this configuration, the tip 301 of the connecting end portion 35 is accommodated into the recess 43*a* formed in the coupling portion 43 of the insulating member 40. Therefore, the detachment of the insulating member 40 from the terminal fitting 30 is further suppressed.

(3) The side surfaces 351 of the terminal fitting 30 include the first side surface 351A located on the one side in the second direction Y and the second side surface 351B located on the other side in the second direction Y. The extending portion 42 of the insulating member 40 includes the part 42A configured to cover the first side surface 351A and the part 42B configured to cover the second side surface 351B. The part 42A configured to cover the first side surface 351A and the part 42B configured to cover the second side surface 351B are provided to sandwich the terminal fitting 30 from the side of the first side surface 351A and the side of the second side surface 351B.

According to this configuration, the insulating member 40 sandwiches the terminal fitting 30 from the side of the first side surface 351A and the side of the second side surface 351B by the part 42A configured to cover the first side surface 351A and the part 42B configured to cover the second side surface 351B. Therefore, the detachment of the insulating member 40 from the terminal fitting 30 is further suppressed.

(4) The surrounding portion 41 includes the first projecting parts 414A extending from the part 42A configured to cover the first side surface 351A toward the centers of the connection surfaces 352A, 352B in the second direction Y and the second projecting parts 414B extending from the part 42B configured to cover the second side surface 351B toward the centers of the connection surfaces 352B, 352B in the second direction Y. The end parts of the first projecting parts 414A and those of the second projecting parts 414B are separated in the second direction Y.

According to this configuration, the insulating member 40 can allow a change in distance between the part 42A configured to cover the first side surface 351A and the part 42B configured to cover the second side surface 351B as compared to the case where the end parts of the first projecting parts 414A and those of the second projecting parts 414B are not separated. Therefore, the insulating member 40 is easily mounted on the terminal fitting 30.

(5) The extending portion 42 is resiliently deformable to change the distance between the part 42A configured to cover the first side surface 351A and the part 42B configured to cover the second side surface 351B in the second direction Y.

According to this configuration, the insulating member 40 can allow a change in distance between the part 42A configured to cover the first side surface 351A and the part 42B configured to cover the second side surface 351B. Therefore, the insulating member 40 is easily mounted on the terminal fitting 30.

(6) The terminal fitting 30 has the first connection surface 352A located on the one side in the third direction X and the second connection surface 352B located on the other side in the third direction X. The surrounding portion 41 includes the parts 416A configured to cover the first connection surface 352A and the parts 416B configured to cover the second connection surface 352B. The parts 416A configured to cover the first connection surface 352A and the parts 416B configured to cover the second connection surface 352B are provided to sandwich the terminal fitting 30 from the side of the first connection surface 352A and the side of the second connection surface 352B.

According to this configuration, since the insulating member 40 can sandwich the terminal fitting 30 from the side of the first connection surface 352A and the side of the second connection surface 352B, the detachment of the insulating member 40 from the terminal fitting 30 can be further suppressed.

(7) The terminal fitting 30 includes the locking recesses 36 formed in the side surfaces 351. The extending portion 42 preferably includes the locking projections 46 to be fit into the locking recesses 36 at positions corresponding to the locking recesses 36.

According to this configuration, since the locking projections 46 provided on the insulating member 40 are fit into the locking recesses 36 provided in the terminal fitting 30, relative displacements of the terminal fitting 30 and the insulating member 40 are restricted. Therefore, the detachment of the insulating member 40 from the terminal fitting 30 can be further suppressed.

(8) The connector 10 includes the terminal units 20 and the housing 50 configured to accommodate the terminal units 20.

According to this configuration, functions and effects based on (1) to (7) described above can be achieved.

<Modifications>

This embodiment can be modified and carried out as follows. This embodiment and the following modifications can be carried out in combination without technically contradicting each other.

Figure 6:
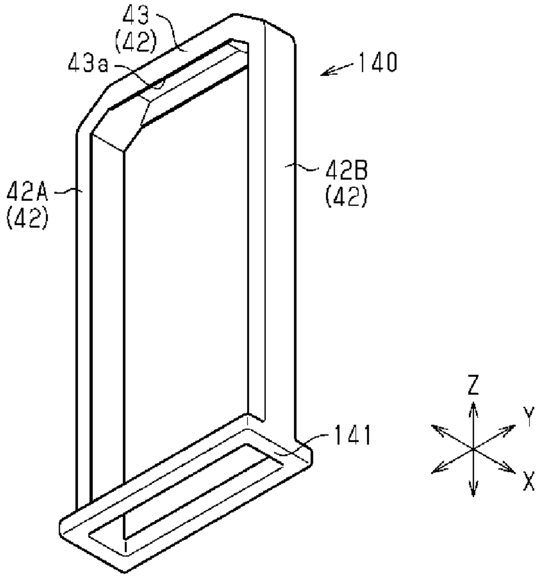
FIG. 6 is a perspective view of an insulating member of a modification.

- The connector 10 may include one terminal unit 20 or may include three or more terminal units 20.
- As shown in FIG. 6, an insulating member 140 not including the dividing portions 44 can also be adopted. A surrounding portion 141 of the insulating member 140 surrounds the connecting end portion 35 over an entire periphery. In this case, the locking projections 46 are preferably omitted.
- Lengths of the first and second projecting parts 414A, 414B can be appropriately changed in a range that relative movements of the terminal fitting 30 and the insulating member 40 in the second and third directions Y, X can be restricted.
- The terminal fitting 30 and the insulating member 40 may be locked to each other by providing locking recesses in the extending portion 42 and providing projections on the side surfaces 351A, 351B of the connecting end portion 35.
- The locking projection 46 may be provided on only either one of the part 42A configured to cover the first side surface 351A and the part 42B configured to cover the second side surface 351B.
- The recess 43*a* of the coupling portion 43 may be omitted and the tip surface of the connecting end portion 35 and the inner surface of the coupling portion 43 may be brought into surface contact.
- The insulating member 40 may be formed of a material such as ceramic different from a resin material if the material has an insulating property.
- The extending portion 42 may be formed with a recess configured to accommodate an end edge Y of the connecting end portion 35 in the second direction. In this case, in terms of the structure of a mold for manufacturing the insulating member 40, the recess is preferably formed in a part of the extending portion 42 closer to the base end side than the locking projections 46.
- The terminal fitting 30 may be, for example, shaped such that the base portion 31 in the form of a flat plate and the connecting end portion 35 are connected on the same plane, i.e. may have a flat plate shape as a whole.
- "Detachment" in this specification means not only complete detachment of the insulating member 40 from the terminal fitting 30, but also a deviation of the insulating member 40 from a proper position with respect to the terminal fitting 30.

LIST OF REFERENCE NUMERALS

X third direction
Y second direction
Z first direction
10 connector
20 terminal unit
30 terminal fitting
31 base portion
32 first straight portion
32*a* through hole
33 second straight portion
34 third straight portion
35 connecting end portion
36 locking recess
40 insulating member
41 surrounding portion
42 extending portion
42A part
42B part
43 coupling portion
43*a* recess
44 dividing portion
45 positioning portion
46 locking projection (projection)
50 housing
51 body portion
52 flange
53 collar
54 outer side wall
55 outer top wall
56 facing wall
56*a* insertion hole
57 inner side wall
58 inner top wall
120 case
140 insulating member
141 surrounding portion

301 tip
351 side surface
351A first side surface
351B second side surface
352A first connection surface
352B second connection surface
353 connection region
414A first projecting part
414B second projecting part
416A part
416B part

What is claimed is:

1. A terminal unit for electrical connection to a mating terminal, the terminal unit comprising:
- a terminal fitting having a plate-like shape and including a connection region for electrical connection to the mating terminal; and
- an insulating member to be mounted on the terminal fitting,
- wherein:
  - the terminal fitting includes
    - a tip provided at a distal end of the terminal fitting,
    - a side surface extending along a plate thickness direction of the terminal fitting, and
    - a connection surface on which the connection region is located, the connection surface extending along a width direction of the terminal fitting to intersect the plate thickness direction,
  - the insulating member includes
    - an extending portion provided at one end of the insulating member to cover the tip of the terminal fitting, the extending portion extending in a longitudinal direction intersecting the width direction and the plate thickness direction, and
    - a surrounding portion provided at an end of the insulating member opposite to the one end with respect to the connection region in the longitudinal direction, the surrounding portion extending in the width direction to cover a part of the connection surface, and
  - the extending portion extends from the surrounding portion toward the tip to cover a part of the side surface and to cover a part of the connection surface.

2. The terminal unit according to claim 1, wherein the extending portion includes a recess configured to accommodate the tip.

3. The terminal unit according to claim 1, wherein:
- the side surface of the terminal fitting is formed by a first side surface and a second side surface that are respectively located on opposite sides of the terminal fitting in the width direction,
- the extending portion includes a part configured to cover the first side surface and a part configured to cover the second side surface, and
- the part configured to cover the first side surface and the part configured to cover the second side surface are provided to sandwich the terminal fitting from the side of the first side surface and the side of the second side surface.

4. The terminal unit according to claim 3, wherein:
- the surrounding portion includes a first projecting part extending from the part configured to cover the first side surface toward a center of the connection surface in the width direction and a second projecting part extending from the part configured to cover the second side surface toward the center of the connection surface in the width direction, and
- an end part of the first projecting part and an end part of the second projecting part are separated in the width direction.

5. The terminal unit according to claim 3, wherein the extending portion is resiliently deformable to change a distance between the part configured to cover the first side surface and the part configured to cover the second side surface in the width direction.

6. The terminal unit according to claim 3, wherein:
- the connection surface of the terminal fitting is formed by a first connection surface and a second connection surface that are respectively located on opposite sides of the terminal fitting in the plate thickness direction,
- the surrounding portion includes a part configured to cover the first connection surface and a part configured to cover the second connection surface, and
- the part configured to cover the first connection surface and the part configured to cover the second connection surface are provided to sandwich the terminal fitting from the side of the first connection surface and the side of the second connection surface.

7. The terminal unit according to claim 1, wherein:
- the terminal fitting includes a locking recess formed in the side surface, and
- the extending portion includes a projection to be fit into the locking recess at a position corresponding to the locking recess.

8. A connector electrically connectable to a mating connector including a mating terminal, comprising:
- the terminal unit according to claim 1; and
- a housing configured to accommodate the terminal unit.

9. The terminal unit according to claim 1, wherein:
- the part of the side surface covered by the extending portion includes a part of the terminal fitting that ranges between the tip and a part of the side surface covered by the surrounding portion, and
- the part of the connection surface covered by the extending portion includes a part of the terminal fitting that ranges between the tip and a part of the connection surface covered by the surrounding portion.

* * * * *